455-613 AU 233 EX
FIP8106 XR 3,894,229

X5010D X53221

United States Patent [19]

Mouri

[11] 3,894,229

[45] July 8, 1975

[54] SIGNAL GENERATOR

[75] Inventor: Hiroshi Mouri, Kyoto, Japan

[73] Assignee: Matsushita Electric Industrial Co., Ltd., Osaka, Japan

[22] Filed: July 23, 1973

[21] Appl. No.: 381,483

[30] Foreign Application Priority Data

| | | |
|---|---|---|
| July 28, 1972 | Japan | 47-76166 |
| July 28, 1972 | Japan | 47-76167 |
| July 28, 1972 | Japan | 47-76168 |
| July 28, 1972 | Japan | 47-89455 |

[52] U.S. Cl. .......... 250/199; 315/200 A; 331/117 R

[51] Int. Cl. .......... H04b 9/00

[58] Field of Search .......... 250/199; 331/154, 155, 331/156, 182, 183, 109, 117 R; 325/392; 178/15; 340/258 B; 315/202 A

[56] References Cited

UNITED STATES PATENTS

| | | | |
|---|---|---|---|
| 3,284,633 | 11/1966 | Hathaway | 250/199 |
| 3,308,391 | 3/1967 | McNamee | 331/109 |
| 3,631,359 | 12/1971 | Jones | 315/200 A |
| 3,678,392 | 7/1972 | Houghton | 325/392 |
| 3,713,045 | 1/1973 | Usuda | 331/156 |
| 3,742,947 | 7/1973 | Hashem | 250/199 |

*Primary Examiner*—George H. Libman
*Attorney, Agent, or Firm*—Stevens, Davis, Miller & Mosher

[57] ABSTRACT

There is provided a signal generator suitable for use in a light signal transmitter for television receiver remote control means and the like. It has an oscillating circuit supplying an oscillation output across the base and emitter of a transistor through a resistor, the resistance of the resistor being appropriately preset, whereby a steady and stable amplitude of the output signal of the generator may be maintained irrespective of variations of the power supply voltage.

5 Claims, 5 Drawing Figures

Control

SIGNAL GENERATOR

This invention relates to signal generators suitable for use in remote control systems, for instance one which uses a light emitting diode capable of sending forth a remote control light signal for remotely controlling the switching of channels, the sound volume, etc. in a television receiver.

In the prior art remote control system which makes use of light as a remote control signal, the transmitter which transmits light for the remote control is usually a separate unit and has a battery as its power source. Therefore, where power consumption is high, the source battery becomes consumed soon, resulting in reduction of the light emitting capacity, so that the transmitter soon becomes incapable of emitting a light signal of sufficient intensity for remote control. Also, the prior art light transmitter has been large in size and heavy in weight, so that the transportation thereof has been very inconvenient. Further, where a light emitting diode is used as the light emitting element, its characteristic is prone to great irregularities, and in such case a fixed remote control range and steady and reliable performance cannot be ensured.

In the light of the above aspects, the object of the present invention is to provide a signal generator which permits maintenance of a sufficiently high radiation strength or intensity of a light signal for maintaining the remote control capacity for an extended period even if the battery becomes consumed in case where the signal generator is applied to a light signal transmitter.

Another object of the present invention is to provide the signal generator which also permit to maintain the amplitude of the produced signal constant irrespective of variations of the power source in case where the signal generator is used for generating other signals.

Still another object of the present invention is to provide the signal generators of constant performance.

The signal generator according to the invention comprises a sinusoidal oscillating circuit, for instance of Hartley or Colpitts type, a transistor controlled by the output of the oscillating circuit, a load such as a light emitting diode connected in series with the transistor, and a battery connected in series with the transistor and the load, wherein the amount of supply of the output of the oscillating circuit to the transistor is preset such that a current flowing through the load may not be reduced even if the power source voltage supplied to the transistor is reduced.

The invention provides excellent effect such that by providing a resonance circuit having the same frequency as the modulation frequency of the light signal emitted from the transmitter on the remotely controlled side, an accurate and reliable remote control system free from malfunctioning can be obtained.

Other objects and advantages of the present invention will become readily apparent from the following detailed description in conjunction with the accompanying drawings, in which.

The invention will now be described in conjunction with an embodiment thereof applied to a light signal emitter for remote control with reference to the accompanying drawing.

Figure 1:
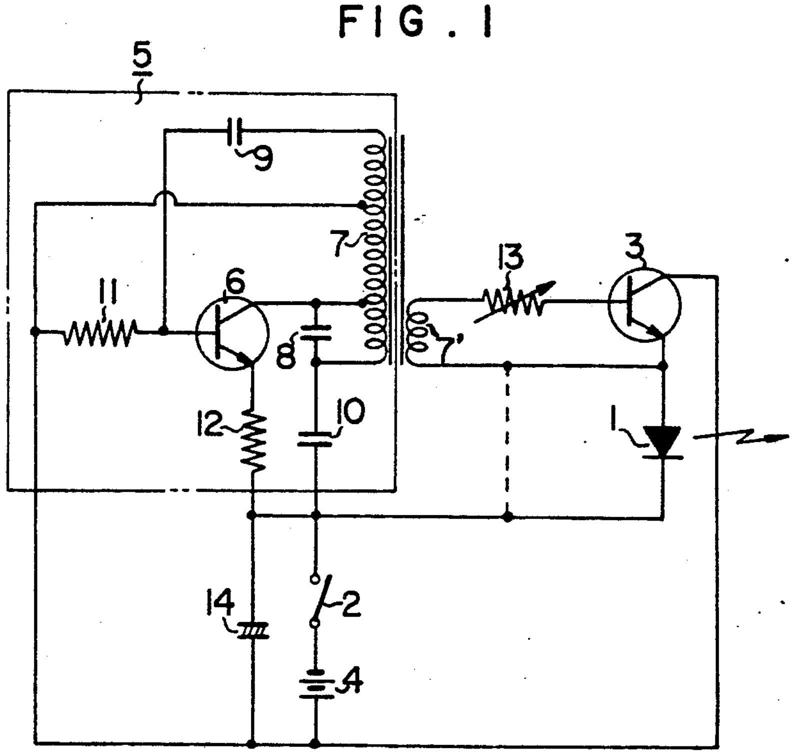
FIG. 1 is a circuit diagram showing a remote control light transmitter used in a remote control system embodying the invention.

FIG. 1 shows a light signal transmitter according to the invention for sending forth remote control light signal for switching channels in a television receiver. The light signal constituting the load in this signal generating means is emitted from a light emitting diode 1, which is connected between a power source switch 2 and the emitter of a switching transistor 3. The collector of the switching transistor 3 is connected to a battery 4 constituting the power supply. Thus, only when the switch 2 is closed and the switching transistor 3 is "on" does a drive current flow from the battery 4 through the light emitting diode causing it to luminesce and emit a light signal. The switch 2 is closed when switching channels in a television receiver. As the battery 4, two 1.5-volt dry cells may usually be used in a series connection. The light emitting diode 1 may be a gallium-arsenic semiconductor for emitting a light signal in the infrared wavelength range or a gallium-phosphorus semiconductor for emitting a light signal in the visible (green) wavelength range. Of course any other suitable light emitting diode may be used as well. In this system, a sinusoidal oscillating circuit 5 is provided for intermittently causing a drive current to flow through the light emitting diode 1 and producing a specially modulated light signal with a simple construction. This oscillating circuit comprises an oscillating transistor 6 constituting a usual Hartley oscillator, a transformer 7 coupled between the collector and base of the transistor 6, capacitors 8, 9 and 10 and biasing resistors 11 and 12. Its oscillating frequency is set to be substantially 40 kHz. This value of 40 kHz is set for the purpose of reducing improper operation due to a noise light signal as much as possible on the basis of the fact that natural light (noise light) contains only a small light component intensity modulated at such a high frequency. The oscillation output of the sinusoidal oscillating circuit 5 is taken from an output coil 7' provided in the oscillation transformer 7 and is impressed as a control signal between the base and emitter of the switching transistor 3 through a variable resistor 13. The variable resistor 13 is provided for adjusting the control level of the transistor 3. Also, a capacitor 14 is provided for reducing the power source impedance.

Figure 2:
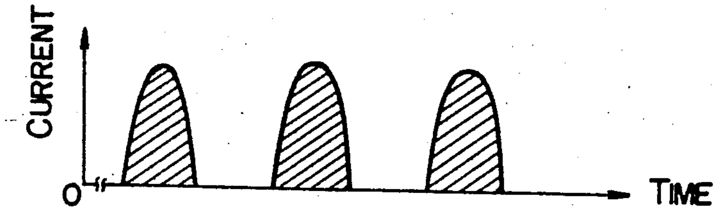
FIG. 2 shows a waveform of a drive current flowing through the light emitting diode shown in FIG. 1.

With this construction, when the switch 2 is closed for effecting remote control, for instance for switching channels in a television receiver, a current is caused to pass through the oscillating transistor 6 for sinusoidal oscillation of the sinusoidal oscillating circuit 5, and the sinusoidal oscillation output thus produced in the output coil 7' of the transformer 7 is coupled between the base and emitter of the switching transistor 3. Thus, the transistor 3 is rendered conductive whenever its base potential is greater than its emitter potential in excess of the contact potential (0.6 to 0.7 volt), thus causing a drive current having a substantially half-wave rectified sinusoidal waveform as shown in FIG. 2. With this drive current, the light emitting diode 1 intermittently emits a pulse light, that is, a remote control light signal consisting of a light pulse train at a repetition frequency of 40 kHz.

Figure 3:
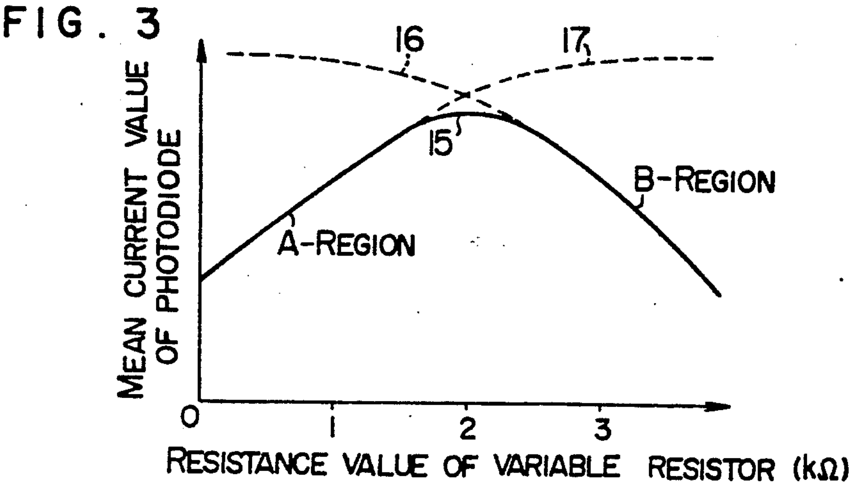
FIG. 3 is a graph showing a characteristic relationship of the mean value of a current flowing in the same light emitting diode versus the resistance of the variable resistor shown in FIG. 1.
Figure 4:
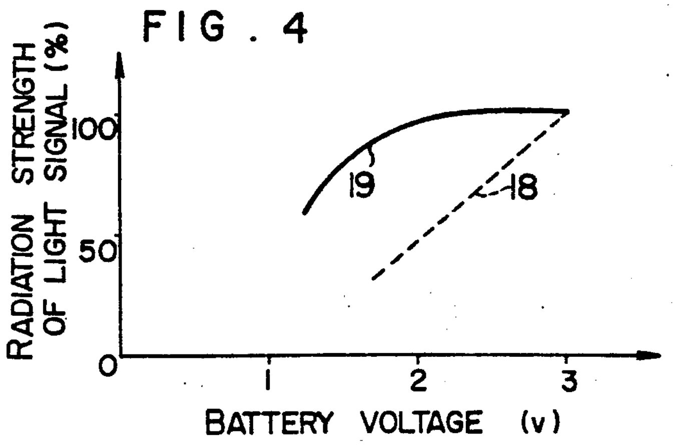
FIG. 4 is a graph showing a characteristic relationship of the radiation strength of light emitted from the same light emitting diode versus the voltage of the battery shown in FIG. 1.

At this time, the sinusoidal oscillation output signal taken from the output coil 7' of the oscillation transformer 7 is supplied across the base-emitter path of the switching transistor 3 through the variable resistor 13. If the amplitude of the signal supplied across the base-emitter path is sufficiently large to saturate the switching transistor 3, the mean value of the drive current flowing through the light emitting diode 1 can be varied by varying the resistance of the variable resistor 13 in a manner as shown by the solid curve 15 in FIG. 3. More particularly, over a range of the resistance of the variable resistor 13 from 0 to about 2 kiloohms (A-region), the drive current is increased by increasing the resistance, while over a range of the resistance above 2 kiloohms (B-region), the drive current is reduced by increasing the resistance. This relation is obtained because with increasing resistance the drive current reduces due to reduction of the base current of the switching transistor 3 in a manner as shown by a characteristic curve 16 while with reducing the base current in this way, the drive current increases due to increasing of base-emitter voltage across the switching transistor 3 due to increasing impedance connected in parallel with the output coil 7' in a manner as shown by a characteristic curve 17, these curves having opposite slopes and representing respectively a saturation characteristic. Bearing these opposing characteristics in mind, according to the invention the range of the resistance of the variable resistor 13 is set to coincide with the afore-mentioned A-region. By so doing, when the voltage of the battery 4 is reduced due to consumption thereof, the amplitude of the sinusoidal oscillation output of the sinusoidal oscillating circuit 5 tends to be reduced to reduce the base current of the switching transistor 3 so as to increase the impedance, so that the base-emitter voltage applied across the transistor is increased (or at least it is not reduced) to cause a possibly large current to flow in the switching transistor 3. On the other hand, with the reduction of the voltage of the battery 4, the anode-cathode voltage across the light emitting diode 1 will also be reduced, tending to reduce the drive current in the diode 1. Accordingly, by appropriately setting the amplitude of the oscillation output of the sinusoidal oscillating circuit 5, characteristics of the switching transistor 3, resistance of the variable resistor 13 and characteristics of the light emitting diode 1 in such a manner that the afore-mentioned changes in opposite directions cancel each other, it is possible to prevent great reduction of the radiation strength or intensity of the remote control light signal even when the voltage of the battery 4 is reduced from the proper value due to the consumption of the battery. In FIG. 4, curve 18 represents a radiation strength characteristic of a usual light signal generator with the radiation strength reduced with reduction of the battery voltage, while curve 19 represents a characteristic obtained with the construction described above according to the invention. As is apparent from FIG. 4, according to the invention the radiation intensity can be maintained unchanged irrespective of the reduction of the battery voltage down to a considerable extent. This means that the service life of the signal generator according to the invention can be greatly extended compared to the prior art signal generator.

While in the construction of FIG. 1 the oscillation output of the oscillating circuit 5 has been supplied between the base and emitter of the switching transistor 3 through the variable resistor 13, similar operation may be obtained by so arranging as to supply it between the base of the switching transistor 3 and the cathode of the diode 1 as indicated by a dashed line in the Figure.

As has been shown, with the remote control transmitter according to the invention the radiation strength of the remote control light signal may be maintained to maintain the remote control capacity for an extended period even with reduction of the voltage of the battery constituting the power supply due to consumption thereof down to a considerable extent. Also, the battery may be used for an extended period, which is an economical advantage. Further, since the battery can be used even in its consumed state, a small-size, light-weight and small-capacity battery may be used, so that it is possible to provide a small-size, light-weight transmitter. Furthermore, by setting the control range of the resistance of the variable resistor 13 within the afore-mentioned A-region, the irregularities of the light emission characteristics of the light emitting diode 1 may be compensated for, further permitting the obtaining of constant performance of the products at the time of manufacture. A further important feature of the invention resides in that the drive current in the diode 1 is controlled with a simple sinusoidal oscillating circuit and a switching transistor and without using any pulse generator of a complicated construction as in the prior art so that it is possible to provide a simple, small-size and inexpensive circuit and reduce consumption of the battery.

Figure 5:
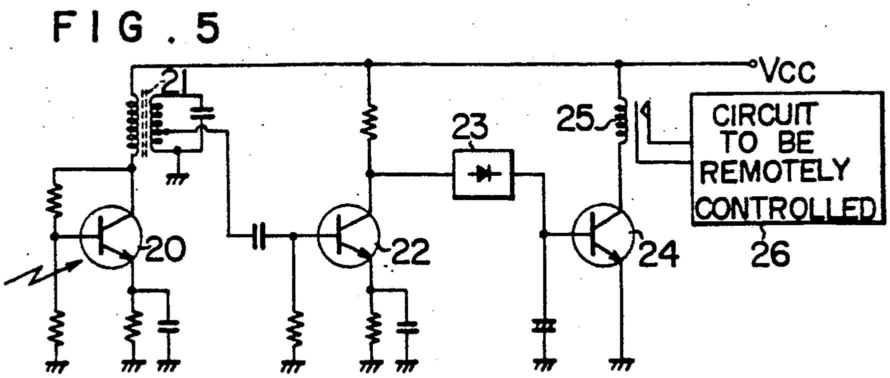
FIG. 5 is a circuit diagram showing a receiver which is remotely controlled by the remote control system embodying the invention.

FIG. 5 shows a receiver which is controlled by the remote control means described above. This receiver includes a phototransistor 20 for receiving the light signal, a resonance circuit 21 provided at the collector of the phototransistor 20, an amplifying transistor 22, a rectifying circuit 23, a switching transistor 24, a relay 25 provided at the collector of the switching transistor 24, and a circuit 26 which may be a tuner of a television receiver and is remote controlled. With this construction, the tuning frequency of the resonance circuit 21 is set to be identical with the oscillation frequency of the afore-mentioned sinusoidal oscillating circuit 5 of the transmitter. Thus, only when a remote control light signal transmitted from the afore-mentioned diode 1, that is, a light signal modulated at the same frequency as the oscillation frequency of the sinusoidal oscillating circuit 5, is received by the phototransistor 20, the resonance circuit 21 produces a sinusoidal wave, which is amplified through the transistor 22 and rectified through the rectifying circuit 23, whose output is used to trigger the switching transistor 24. Upon triggering of the transistor 24 the relay 25 is actuated to control the circuit 26 for effecting, for instance, the switching of channels in a television receiver. If the phototransistor 20 receives a light signal modulated at a frequency other than the afore-mentioned frequency, no output is produced from the resonance circuit 21, so that no erroneous control is anticipated.

It is to be understood that while the foregoing description is concerned with a light signal transmitter, the invention may of course be broadly applied to various other signal generators having other loads than a light emitting diode, for instance resistors.

What we claim is:

1. A signal generator comprising
a. an oscillating circuit for producing a sinusoidal output voltage signal;
b. a transistor having an emitter, a base and a collector;
c. a load element connected in series with the emitter-collector circuit of said transistor;
d. a dry element battery connected to said oscillating circuit and across said series-connected load element and transistor, the voltage of said battery characteristically becoming lower with the passage of time; and
e. means for coupling the output of said oscillating circuit between the base and emitter of said transistor, said coupling means including a resistor connected in series with the base of said transistor and the output of said oscillating circuit, the resistance of said resistor being selected to prevent reduction in the current through said load element despite a reduction in the voltage of said battery or in the output voltage signal of said oscillating circuit, the impedance between the base and emitter of said transistor not increasing and the voltage supplied between the base and emitter of said transistor not being reduced even when the output of said generating circuit is reduced and the base current of said transistor is reduced.

2. A signal generator as defined by claim 1 wherein said load element is a light emitting diode, said diode producing a remote control light signal.

3. A signal generator as defined by claim 1 wherein said load element is a light emitting diode, said diode producing a light signal for remote control by emitting pulsed light only during half periods of the output of said sinusoidal oscillating circuit.

4. A signal generator as defined by claim 3 wherein said sinusoidal oscillating circuit includes an oscillation transformer having an output coil, one end of said output coil being connected to the base of said transistor through said resistor and the other end of said coil being connected to the emitter of said transistor.

5. A signal generator as defined by claim 2 which further comprises a light receiving element for receiving the light signal transmitted from said light emitting diode; a resonance circuit coupled to said light receiving element, the output voltage of said resonance circuit having only the same frequency as the oscillation frequency of said oscillating circuit; and a control circuit coupled to said resonance circuit for controlling a remotely controlled system in accordance with the output of said resonance circuit.

* * * * *